June 22, 1948.  R. MORSE  2,443,988
DENTURE CLEANER AND HOLDER
Original Filed Dec. 22, 1945
Fig. 1
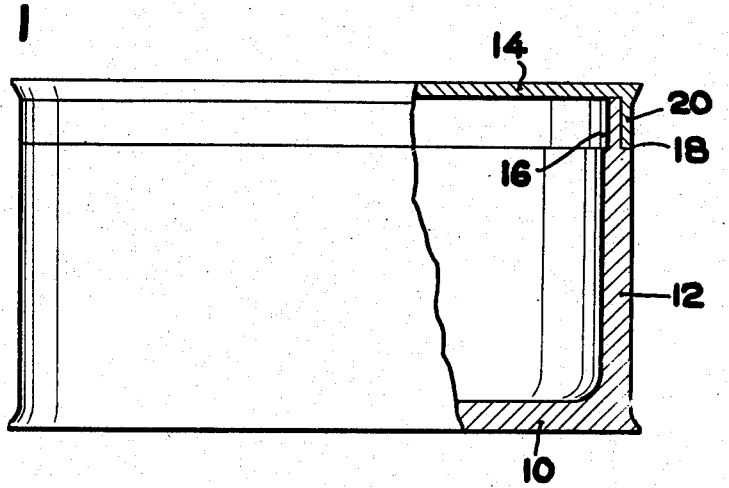
Fig. 2
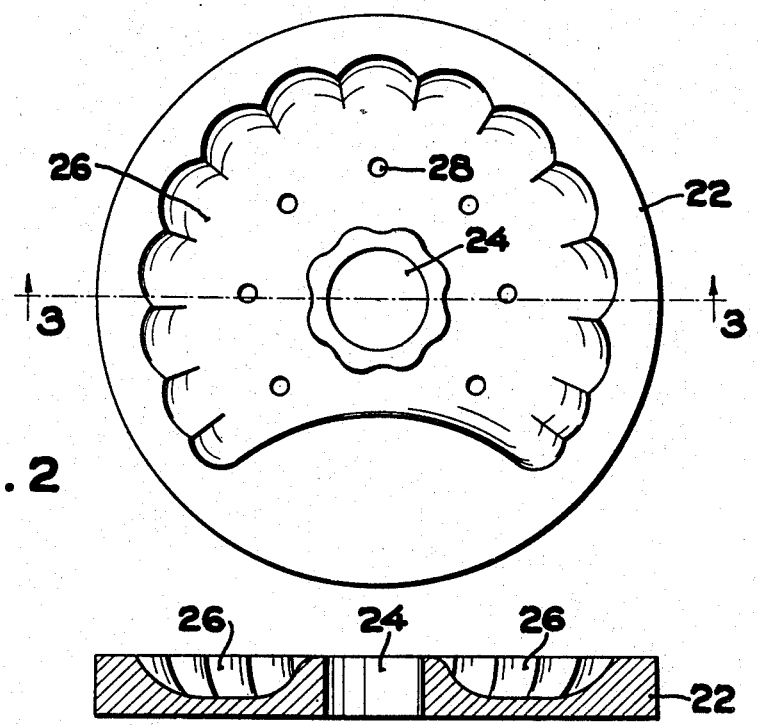
Fig. 3
INVENTOR.
RICHARD MORSE
BY
Charles R. Fay,
Attorney Patented June 22, 1948

2,443,988

UNITED STATES PATENT OFFICE 2,443,988

DENTURE CLEANER AND HOLDER

Richard Morse, Mattapoisett, Mass.

Original application December 22, 1945, Serial No. 636,634. Divided and this application November 7, 1946, Serial No. 708,359

1 Claim. (Cl. 206—1)

This invention relates to denture cleaners and holders, and the principal objects of the invention reside in the provision of a disc having a surface indented or recessed for the reception of a dental plate for holding the latter while cleaning the same for instance with a brush, said disc having means for holding bridgework and partial plates also for the same purpose; the provision of a container comprising a circular wall, bottom, and removable cover, said wall being recessed to present an interior shoulder accommodating the disc to hold the same above the bottom of the container for the cleaning operation, the disc having drainage holes so that cleaning fluids will be caught in the container; and the provision of a sanitary denture holder and container as aforesaid including a flanged cover for the container fitting down over the top of the latter and forming an enclosure for dentures and also for the disc when not in use.

Further objects of the invention include the provision of a sanitary denture cleaner and holder which is inexpensive and convenient and providing means to protect the denture against dust, dirt, and foreign matter.

Other objects and advantages of the invention will appear hereinafter.

Reference is to be had to the accompanying drawings, in which

Fig. 1 is a view in elevation of the container, parts being in section;

Fig. 2 is a top plan view of the disc; and

Fig. 3 is a section on line 3—3 of Fig. 2.

Fig. 1 shows a container according to the invention and comprising a bottom wall 10, an upstanding circular side wall 12, and a cover 14. The wall 12 is recessed at the top interiorly at 18. The cover is provided with a flange 20 fitting down over the side wall and received in the exterior recess so that the side wall and flange are flush. The interior groove or recess 16 accommodates and supports a disc 22 in spaced relation to the bottom 10.

Disc 22 is provided with a central opening at 24 to receive bridgework or partial dentures, and the area of the disc on one side surface thereof between the opening and the disc periphery is formed with a recess 26 of the general shape of a dental plate. It will be clear that with the disc located on a flat surface or supported on the shoulder or recess 16, with the recessed surface 26 uppermost, a denture will be held in the recess 26 and may be easily and conveniently cleaned and brushed. Drainage holes 28 are provided in the recess 26.

After cleaning the denture may be deposited in the container, in antiseptic liquid or the like, and the cover 14 may be located in place in the groove 18 to close the container with the denture safely housed therein and with the disc still in place on shoulder 16.

Partial plates and bridges may be thrust through the opening 24 and cleaned one part at a time without the necessity of holding the plate in the hand.

The container and disc may be made of any suitable materials, such as glass, synthetic plastic, rubber, wood, etc.

This case is a divisional case of my copending application, Serial No. 636,634, filed December 22, 1945.

Having thus described my invention and the advantages thereof, I do not wish to be limited to the details herein disclosed, otherwise than is set forth in the claim, but what I claim is:

Denture holder and cleaner device comprising a substantially circular container including a bottom and cylindrical side wall, and having an open top, the side wall being recessed circularly both inside and out, a flanged cover fitting the exterior recess, and a removable denture holding disc receivable and supportable in the interior recess, the disc being held thereby high enough to provide a receptacle for a denture in the container under the disc, and one surface of the latter having a depression for fitting and holding the denture for cleaning, the depression being in the top surface of the disc so that it is always ready for use upon removing the cover.

RICHARD MORSE.

REFERENCES CITED

The following references are of record in the file of this patent:

UNITED STATES PATENTS

| Number | Name | Date |
|---|---|---|
| 1,725,265 | Glendinning | Aug. 20, 1929 |
| 1,991,022 | Lewis | Feb. 12, 1935 |
| 2,375,645 | Gordon | May 8, 1945 |

FOREIGN PATENTS

| Number | Country | Date |
|---|---|---|
| 426,871 | Great Britain | Apr. 5, 1935 |